United States Patent [19]

Morehouse et al.

[11] Patent Number: 5,237,472
[45] Date of Patent: Aug. 17, 1993

[54] RIGID DISK DRIVE WITH DYNAMIC HEAD LOADING APPARATUS

[75] Inventors: James H. Morehouse, Jamestown; David M. Furay; James A. Dunckley, both of Boulder; Bruce D. Emo, Longmont, all of Colo.

[73] Assignee: Integral Peripherals, Inc., Boulder, Colo.

[21] Appl. No.: 766,479

[22] Filed: Sep. 25, 1991

Related U.S. Application Data

[63] Continuation-in-part of Ser. No. 629,957, Dec. 19, 1990.

[51] Int. Cl.[5] .................... G11B 5/54; G11B 21/22
[52] U.S. Cl. .................................. 360/105; 360/104
[58] Field of Search ..................... 360/104, 105, 106

[56] References Cited

U.S. PATENT DOCUMENTS

| | | | |
|---|---|---|---|
| 3,984,873 | 10/1976 | Pejcha | 360/105 |
| 4,535,374 | 8/1985 | Anderson et al. | 360/105 X |
| 4,663,682 | 5/1987 | McNeil | 359/105 |
| 4,752,848 | 8/1988 | Garcia et al. | 360/105 |
| 4,870,703 | 9/1989 | Augeri et al. | 360/105 |
| 4,933,785 | 6/1990 | Morehouse et al. | 360/105 X |
| 5,027,241 | 6/1991 | Hatch et al. | 360/105 |

OTHER PUBLICATIONS

"Prairie 120", PrairieTek Corporation publication, Oct. 1989.

Primary Examiner—Stuart S. Levy
Assistant Examiner—Paul J. Ditmyer
Attorney, Agent, or Firm—Skjerven, Morrill, MacPherson, Franklin and Friel

[57] ABSTRACT

In one embodiment, a rigid disk drive including a rotary actuator having a lift tab extending asymmetrically from the end of the load beam which supports a slider with read/write element is disclosed. The free end of the lift tab cooperates with a cam surface on a cam assembly to provide dynamic loading and unloading of the slider while imparting a roll to the slider as it is loaded to and unloaded from the disk. In another embodiment, the lift tab 117 extends from the end of the load beam 114-1 along an axis generally parallel to the longitudinal axis 177 of the load beam 114-1 but the axis 178 of the lift tab 117 is offset from the longitudinal axis 177 of the load beam 114-1.

5 Claims, 14 Drawing Sheets

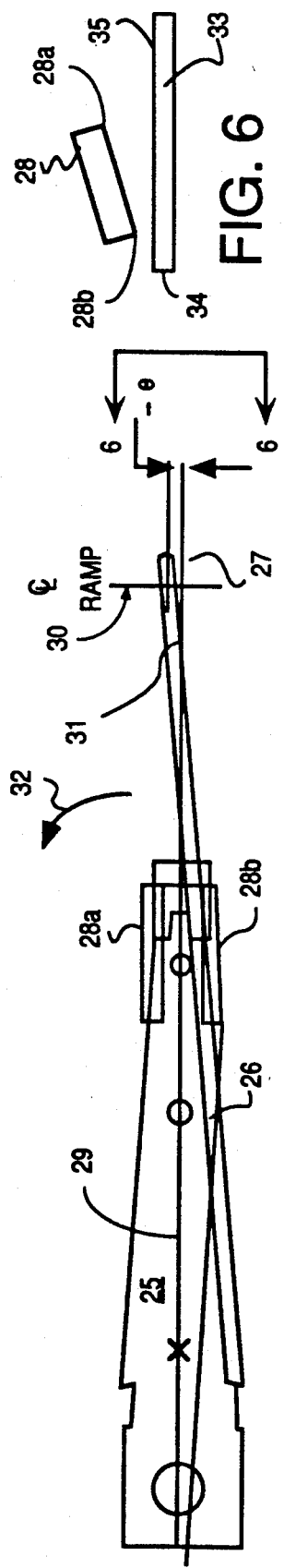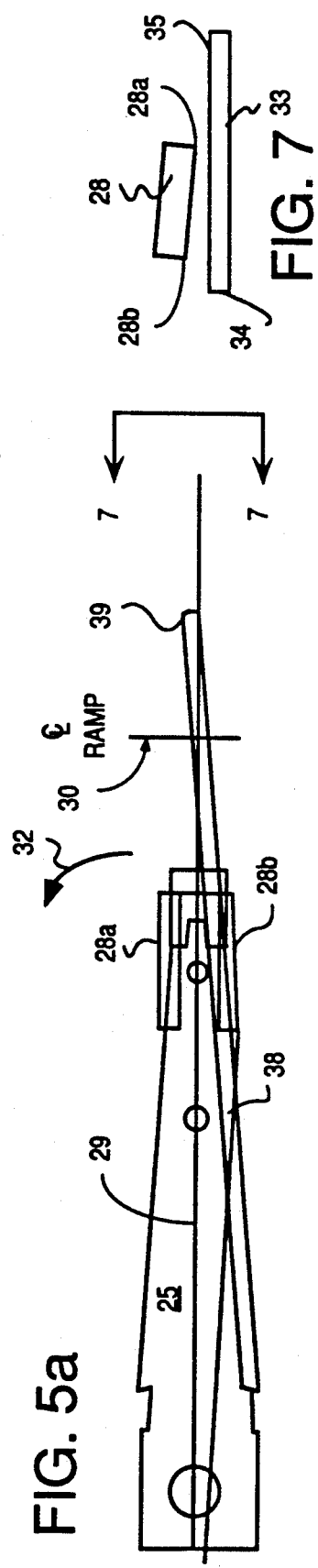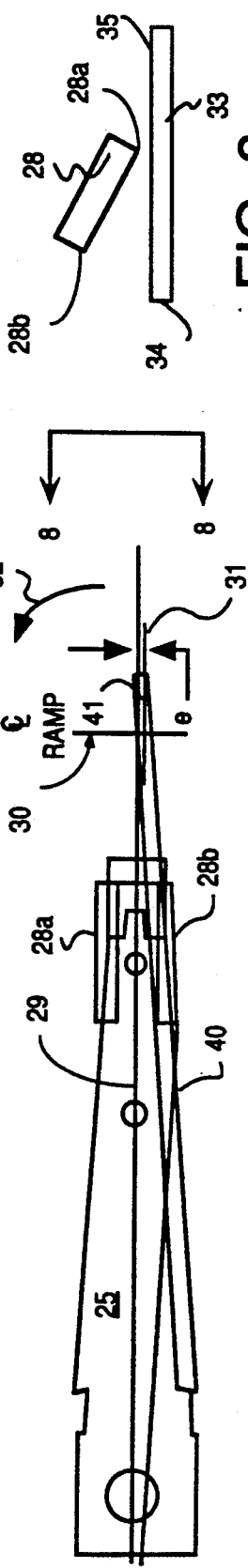

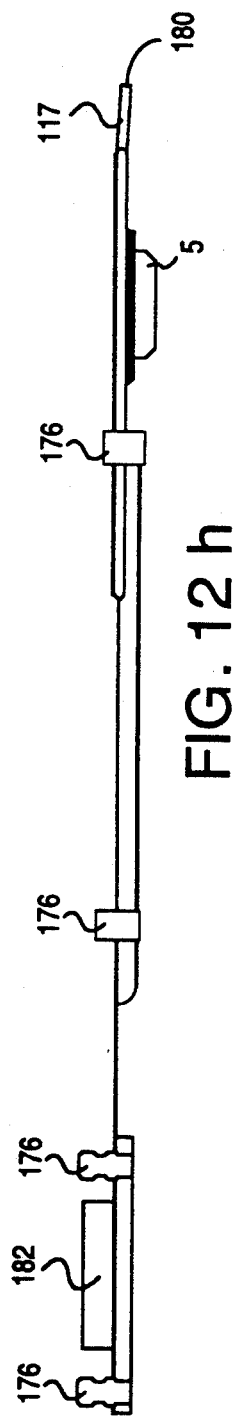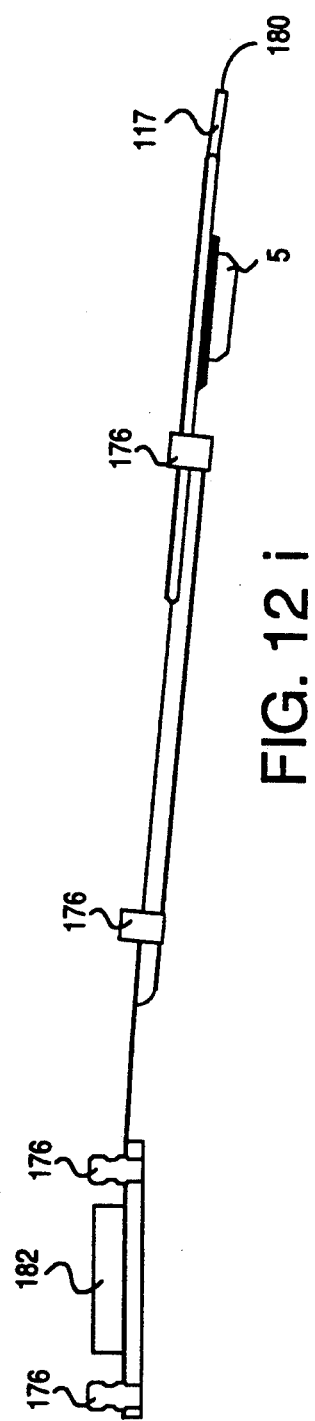

RIGID DISK DRIVE WITH DYNAMIC HEAD LOADING APPARATUS

CROSS-REFERENCE TO RELATED APPLICATION

This application is a continuation-in-part of U.S. patent application Ser. No. 07/629,957 filed Dec. 19, 1990 by James H. Morehouse, David M. Furay and James A. Dunckley, entitled "Rigid Disk Drive With Dynamic Head Loading Apparatus".

BACKGROUND OF THE INVENTION

1. Field of the Invention

This invention relates to the field of information storage utilizing rigid disks, and more particularly to apparatus for dynamically loading and unloading read/write magnetic recording elements for flight above the surface of moving magnetic media.

2. Description of the Prior Art

In certain types of disk files which include rigid magnetic media it is desirable to load and unload a magnetic recording reproducing element into flight above the surface of the moving media as opposed to utilizing take off from and landing on the magnetic media where the magnetic recording element comes to rest on the disk after rotation has ceased and takes off from the disk after the disk is once again spun up. U.S. Pat. No. 4,535,374 to Anderson et al., issued Aug. 13, 1985, is exemplary of a rigid disk drive of the linear actuator type which provides for dynamic loading of magnetic read/write heads above the surface of a disk. In Anderson et al. a stationary cam follower is provided on and supported from the housing, and the load arm, which includes a magnetic recording head at its free end, is provided with a cam surface intermediate the free end and the end supported by the actuator. The cam surface cooperates with a stationary cam to lift the head above the surface of the disk when the head arm is retracted.

Another linear actuator rigid disk drive utilizing a cam arrangement to achieve dynamic loading of the magnetic r recording head above the disk is illustrated in U.S. Pat. No. 4,663,682 to McNeil, issued May 5, 1987. In McNeil, a pair of cam surfaces are supported by the disk drive housing and a wing, having a pair of free ends, is attached to the load beam intermediate the actuator driving mechanism and the free end of the load beam which supports the head slider. The free ends of the wing cooperate with the cam surfaces to lift the magnetic recording head slider above the surface of the disk when the head arm is retracted. In McNeil, the direction of movement of the magnetic media beneath the magnetic recording head is such that the media is moving in a direction which is parallel to the longitudinal axis of the slider on which the magnetic recording element is supported and perpendicular to the longitudinal axis of load beam. The cam surfaces in McNeil are offset and provide pitch to the slider during the loading process when the slider is approaching the surface of the rotating media.

U.S. Pat. No. 4,933,785 to Morehouse et al., issued Jun. 12, 1990, and assigned to Prairietek Corporation, discloses a magnetic disk drive utilizing a rotary actuator. The load beams (which support the read/write elements) each include a lift button which is supported on the load beam, and positioned on the longitudinal axis of the load beam. The lift buttons cooperate with a spreader, which includes cam surfaces, to provide dynamic loading and unloading of the slider which is supported on the end of the load beam opposite of the pivot point of the load beam. The buttons and the cooperating spreader with cam surfaces are located intermediate the pivot point of the rotary actuator and the magnetic head. The button and cam surface on the spreader provide a symmetrical lift to the load beam and correspondingly symmetrical loading of the magnet head above the media, which in this configuration is rotating in the direction beneath the head which is substantially parallel to the longitudinal axis of the load beam which is supporting the slider.

A later introduced rigid disk drive from Prairietek Corporation, utilized a dynamic loading structure having a cam surface supported on the housing which contacted directly the load beam of the rotary arm having the magnetic slider on its free end. In this Prairietek hard disk drive, denominated the model 120, the cam is supported on the housing and is positioned intermediate the head slider and the pivot point of the rotary actuator. The principle distinction between the dynamic loading structure in the model 120 over the structure illustrated in the '785 patent is the elimination of the button which was included on the load beam and provided a center line lift on the load beam. In the model 120 disk drive a heavy roll torque is applied to the load beam and there is no ability to change the amount of torque and correspondingly the roll applied to load beam.

U.S. Pat. No. 3,984,873, issued Oct. 5, 1976 to Pejcha illustrates a structure for dynamically loading heads, which in one embodiment utilizes a movable channel member which is supported above the surface of the rotating rigid disk. The loading of a head above the surface of the disk is achieved by providing flat spring extensions which extend symmetrically from the free end of the load beam and are captured in the channel which is positioned in a plane above the surface of the disk such that the opening is generally parallel to the plane of the disk. With the spring extensions captured in the channel, the heads are prevented from being loaded on the disk. To load the heads the channel member is moved out of contact with the flat spring extensions and the heads move toward the surface of the associated disk. In another embodiment, the flat spring extensions on the ends of the load beam are crisscrossed and a pivoted member is moved into contact with the crisscrossed free ends to unload the heads from the disk. In a third embodiment, a cam surface is provided adjacent to the edge of the rotating disk and the magnetic head is supported on a spring member which is affixed by bolts to a rotating arm. An extension of the spring member on the end adjacent to the magnetic head is positioned at right angles with respect to the center line of the rotary arm on which the head and spring is mounted, with the spring extension having a longitudinal axis which is parallel to the longitudinal axis of the cam surface.

U.S. Pat. No. 5,027,241, issued Jun. 25, 1991 to Hatch et al. illustrates a rotary actuator using a dynamic loading tab which extends from the end of the load beam. In Hatch et al., the load tab (which cooperates with a cam for loading and unloading the slider from the surface of the disk) extends outwardly from the end of the load beam and is symmetrically aligned with the centerline of the load beam. Although this provides geometric symmetry, it does not provide zero torque on the load beam as it is lifted from the disk. In contrast, in accordance with one embodiment of the present invention an asymmetrically positioned lift tab is used whereby the amount of roll provided to the slider as it is lifted from the surface of the disk can be fine tuned to an optimum level. In a second embodiment of the present invention a lift tab structure which provides a zero torque force on the load beam is provided. This is achieved by utilizing an offset load tab.

SUMMARY OF THE INVENTION

An object of the present invention is to provide a rigid disk drive which includes a dynamic head loading structure which imparts a roll to the head slider as it is being loaded onto a rotating disk. Another object of the present invention is to provide means to control the dynamic head loading structure such that the amount of roll imparted to the head slider is adjustable. An additional object of the present invention is to provide a dynamic head loading structure which provides zero torque on the load beam as it is being lifted from the surface of the disk. A further object of the present invention is to provide a dynamic head loading structure for a rotary actuator in which the rotary actuator can be loaded into operative relationship with a cam assembly from the back side of the cam assembly to simplify the initial assembly of the rotary actuator structure in the drive as well as avoiding damaging the disk surface. A further object of the present invention is to provide a dynamic loading structure which is uncomplicated and can be constructed from readily available components. A further object of the present invention is to provide a means to protect the magnetic heads of a rigid disk drive which are facing when the heads are unloaded from the surface of the disk.

In accordance with one embodiment of the present invention, a lift tab is provided on the free end of an actuator arm which supports a slider for travel on an air bearing above the surface of a rigid magnetic recording disk. The lift tab is positioned such that is extends from the free end of the actuator arm at an angle which is skewed from the longitudinal axis of the actuator arm. The lift tab cooperates with a cam surface (which is supported on the baseplate) and as a result of the asymmetrical location of the lift tab with respect to the longitudinal axis of the actuator arm, the actuator arm is pivoted, which provides a roll orientation to the slider as it is loaded onto the disk.

In accordance with a second embodiment of the present invention, the lift tab provided on the free end of the actuator arm is positioned in an axis which is displaced from the longitudinal axis of the load beam by an amount which is selected such that the lifting force on the load beam is applied generally along the longitudinal axis of the load beam to avoid any twisting torque being applied to the load beam.

In accordance with yet another embodiment of the present invention, a dynamic load beam structure is provided in which the lift tab having the offset end portion is a separate structural element from the main body of the load beam.

BRIEF DESCRIPTION OF THE DRAWINGS

Other objects and advantages of the invention will become apparent from a study of the specification and drawings in which:

FIGS. 5a-5c illustrate the structure for achieving negative roll, no roll and positive roll for a slider supported on a head gimbal assembly;

FIGS. 6 to 8 illustrate, respectively, a slider having a negative roll, no roll and positive roll attitudes;

FIG. 12a is a plan view of a load beam utilized in the second dynamic head-loading embodiment of the present invention;

FIG. 12b is a view taken along lines 12b—12b in FIG. 12a;

FIG. 12c is a view taken along lines 12c—12c in FIG. 12a;

FIG. 12c, is a top plan view of a portion of a load beam used in the second embodiment of the present invention;

FIG. 12c" is a cross sectional view taken along lines 12c"—12c" in FIG. 12c';

FIG. 12d is a cross-sectional view taken along lines 12d—12d in FIG. 12a;

FIG. 12e is a cross-sectional view taken along lines 12e—12e in FIG. 12a;

FIG. 12f is a cross-sectional view taken along lines 12f—12f in FIG. 12a;

FIG. 12g is a top-plan view of a load beam used in the dynamic head-load version of drive in accordance with the present invention;

FIG. 12h is a view taken along lines 12h—12h in FIG. 12g showing the load beam in the loaded position;

FIG. 12i illustrates the load beam in FIG. 12h, but in an unloaded position;

DETAILED DESCRIPTION OF THE PREFERRED EMBODIMENTS

Figure 1:
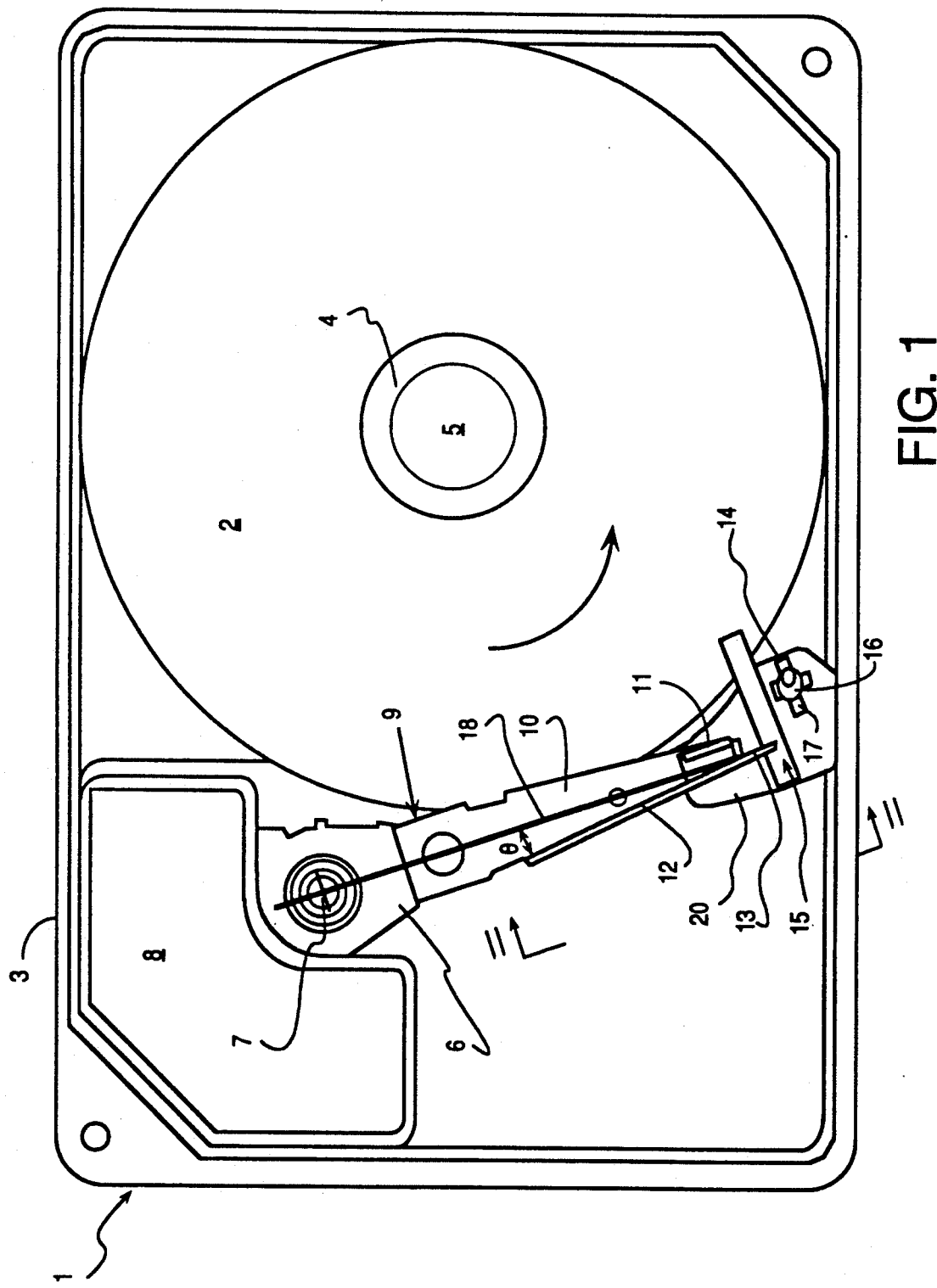
FIG. 1 is a top plan view of a rigid disk drive incorporating the dynamic head loading apparatus in accordance with the present invention.
Figure 2:
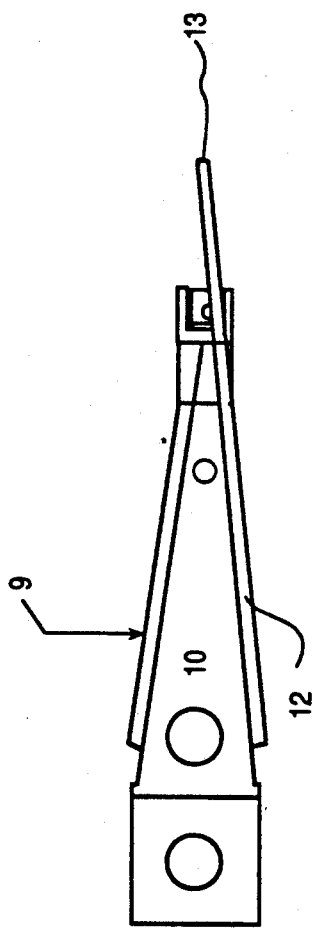
FIG. 2 is a top plan view of the down-facing head gimbal assembly utilized in the rigid disk drive of FIG. 1.
Figures 3, 4:
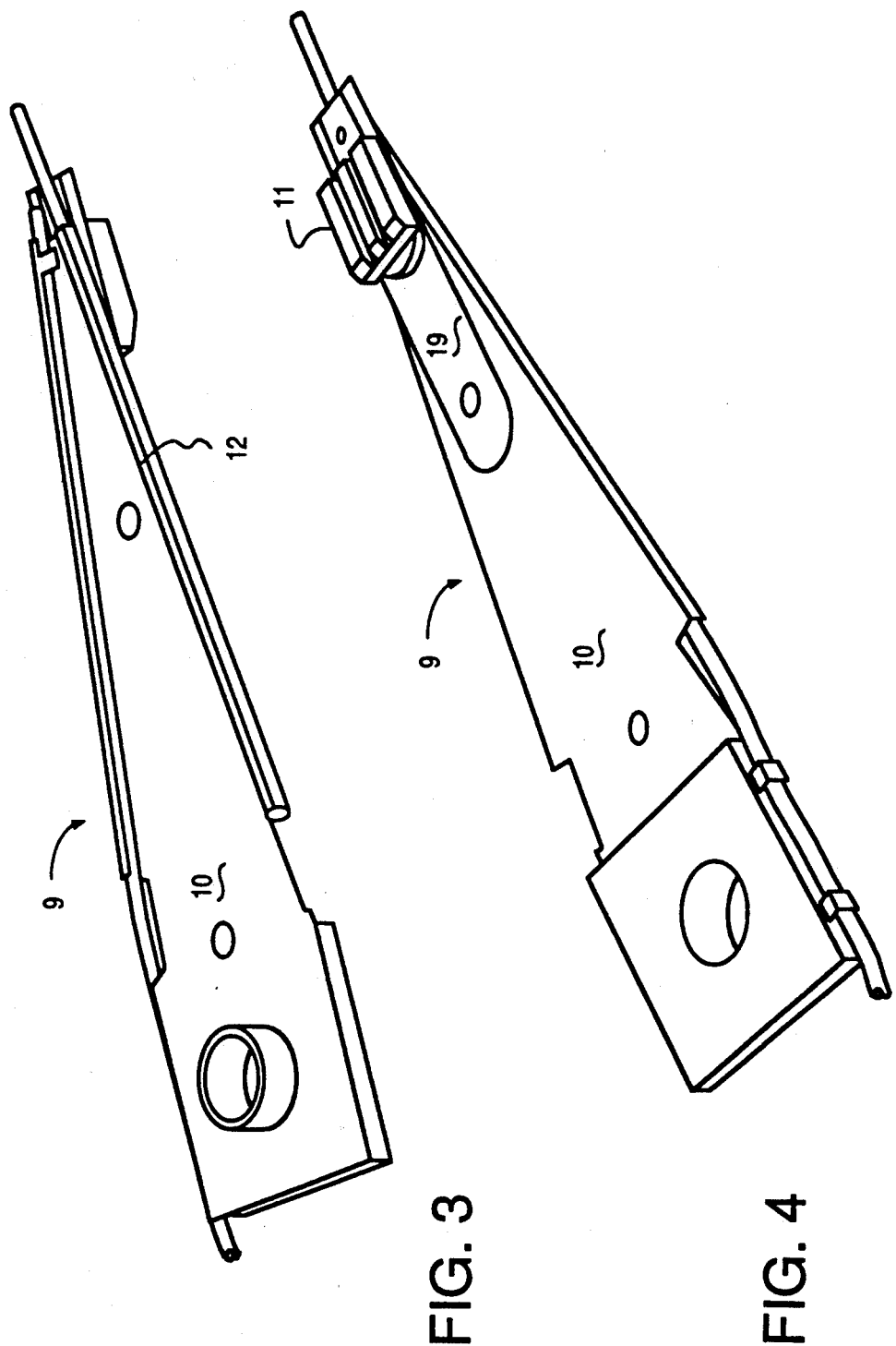
FIG. 3 is a perspective view of the head gimbal assembly of FIG. 2.
FIG. 4 is a perspective view of the lower side of the head gimbal assembly illustrated in FIG. 3.
Figure 9:
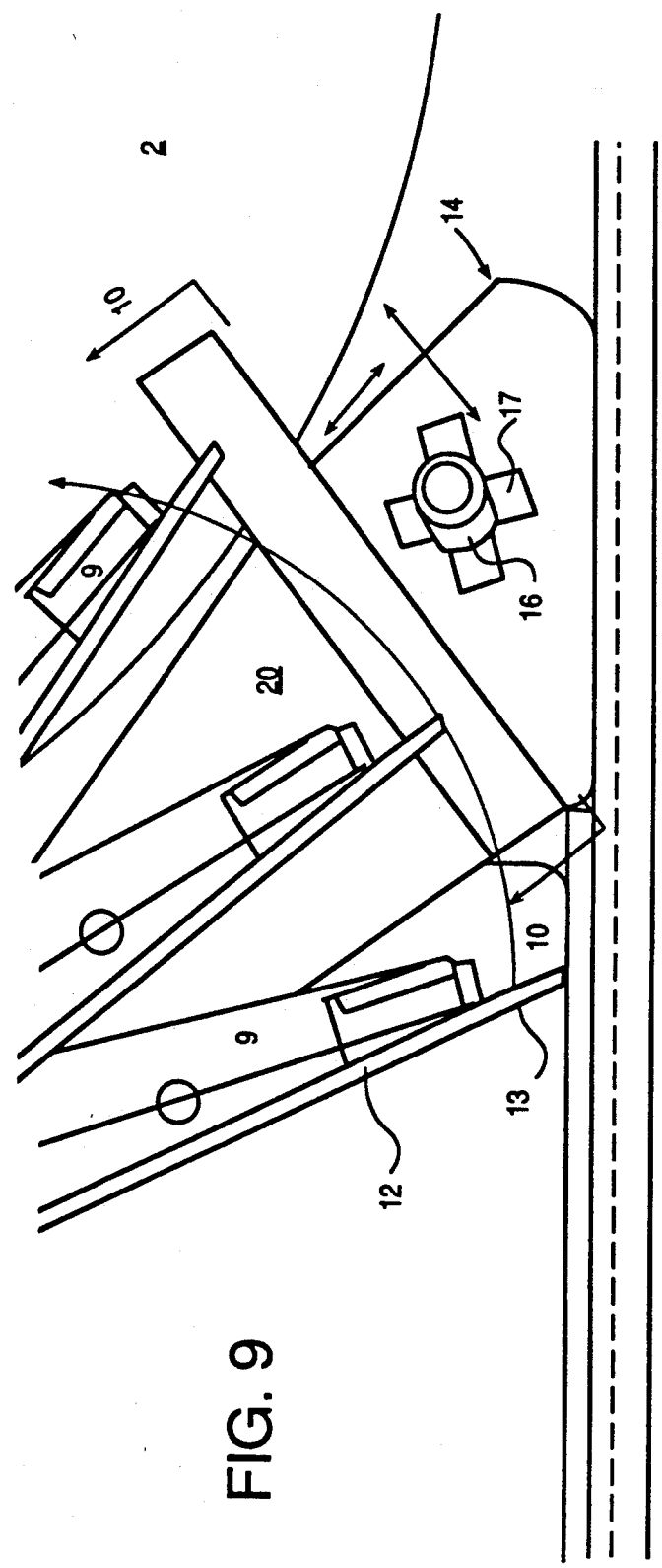
FIG. 9 is a highly enlarged view of a portion of the disk drive illustrated in FIG. 1 showing the head gimbal assembly in a plurality of locations in its travel with respect to the cooperating cam assembly.

Referring to FIG. 1, rigid disk drive 1 in accordance with the first embodiment present invention illustrated in a top plan view. Rigid disk drive 1 is illustrated in highly enlarged scale for illustrative purposes. Included in rigid disk drive 1 is rigid disk 2, which may include magnetic coated surfaces for the recording and reproduction of digital information. Rigid disk 2 is supported for rotation by a suitable motor and spindle combination (not shown). Clamp 4 secures rigid disk 2 to hub 5 of the motor for rotation with the rotor portion of the motor. Rigid disk drive 1 utilizes a rotary actuator which includes actuator body 6 which rotates about a center of rotation 7. A suitable coil and permanent magnet motor (not shown) of the type well known in the art are positioned beneath return plate 8 of the permanent magnet actuator motor assembly. Although in the disclosed embodiment of the invention a permanent magnet motor is used to position the actuator, other types of suitable drive mechanisms may be used for moving the rotary actuator. Head gimbal assembly 9 is secured to actuator body 6 and rotates about center of rotation 7. Head gimbal assembly 9 includes a generally flat, triangular shaped load beam 10 which supports near its free end a slider body 11 which includes a read/write element for writing information to and reading information from magnetic recording disk 2. Attention is directed to FIGS. 2, 3 and 4 where additional views of head gimbal assembly 9 are illustrated. In accordance with the present invention, a second head gimbal assembly may be utilized beneath the surface of rigid disk 2 to provide for record and reproduction of data on the lower surface of rigid disk 2. Head gimbal assembly 9 includes lift tab 12, which in the embodiment illustrated comprises a rod, which is suitably affixed to the upper surface of load beam 10. Alternatively, the lift tab could be formed integrally with the load beam. Although in the embodiment illustrated herein lift tab 12 is positioned on the side of load beam 10 which is beyond (with respect to the center of disk 2) center line 18, lift tab 12 could be positioned on the other side of center line 18 (that is between center line 18 and the edge of load beam 10 which is nearer the center of disk 2). Supported in operative relationship with the free end 13 of lift tab 12 is a cam assembly 14 which is supported on baseplate 3. Included on cam assembly 14 is cam surface 5, the contour of which will be best appreciated by reference to FIG. 6. Load beam 10 of head gimbal assembly 9 provides a downward force (when viewed as illustrated in FIG. 1) which maintains free end 13 of lift tab 12 in contact with cam surface 15. As will be appreciated by reference to FIGS. 1, 5 and 6, a portion of cam surface 15 extends over the upper surface of rigid disk 2. Cam assembly 14 is affixed to baseplate 3 using a suitable fastening means, such as a bolt 16 having a threaded end (not shown) which cooperates with a threaded opening (not shown) in baseplate 3. As illustrated in FIGS. 1 and 9, cross-shaped slot 17 permits adjustment of cam assembly 14 in the directions indicated by the arrows in FIG. 5. Adjustability of cam assembly 14 in the direction of arrows which are generally radial with respect to the disk provides the ability to vary the landing position of the slider on the disk and thereby compensate for manufacturing tolerances. Load beam 10 may be constructed of 0.0025" thick, 300 series stainless steel, although other material may be utilized. In the embodiment illustrated herein, lift tab 12 comprises a stainless steel rod and Delrin (an acetal resin compound) is used for cam surface 15. This combination of materials provides a low friction interface, however it will of course be appreciated that other combinations of materials may be utilized. Other suitable low friction materials, such as an acetal resin compound impregnated with PTFE, or other plastic material with low friction characteristics could alternatively be used for cam surface 15. A suitable adhesive, such as an epoxy, is used to secure the stainless steel rod to load beam 10. An alternate construction would be to weld or braze rod 12 to load beam 10.

The center line of load beam 10 (indicated in FIG. 1 by reference character 18) passes through center of rotation 7 of rotation of rotary actuator 7 and extends to the free end of load beam 10. In the present embodiment, as will be appreciated by reference to FIG. 1, the center line of lift tab 12 is not parallel to center line 18 of load beam 10. The angle of deviation between center line 18 of load beam 10 and the center line of lift tab 12 is indicated in FIG. 1 by the greek letter theta ($\theta$). In the embodiment illustrated herein, lift tab 12 extends along one edge of load beam 10, however other variations may be utilized and it is not essential to the practice of the invention that lift tab 12 have its central axis parallel with an edge of load beam 10. The important relationship to be maintained with respect to the center line of lift tab 12 and the center line of load beam 10 is that the angular relationship of lift tab 12 provide an asymmetrical lifting force on load beam 10 to provide a roll attitude to slider 11 as it approaches the surface of rigid disk 2 during loading of slider 11 above disk 2. As will be described more fully hereinafter, the roll applied to the slider may be either "positive" or "negative" and both provide advantageous results. After lift tab 12 has been moved out of contact with cam surface 15, load beam 10 (and slider 11) assume an attitude such that the lower surface of slider 11 and the lower surface of load beam 10 are substantially parallel to the plane of the surface of disk 2.

Referring to FIG. 3, head gimbal assembly 9 is illustrated in perspective and it will be appreciated that lift tab 12 extends angularly with respect to the center line of load beam 10. Head gimbal assembly 9 may also be referred to as the "down" assembly since the read/write element (not shown) which is supported on slider body 11 faces down toward the upper surface of rigid disk 2 as is illustrated in the orientation in FIG. 1. With lift tab 12 in the orientation in FIG. 3, the downward force of load beam 10 tilts the inner edge of the slider 11 closer to the surface of disk 2 than the outer edge of slider 11 torque valve thereby imparting a positive roll to slider 11.

Referring to FIG. 4, which is a view of the underside of head gimbal assembly 9 illustrated in FIG. 3, slider body 11 is supported on flexure 19 for gimbaling movement above the surface of the disk 2. Head gimbal assembly 9 is of the Watrous-type, or also known as Whitney type suspension; however, the particular type of suspension is not relevant with respect to the present invention. Other suitable slider support arrangements may be utilized to couple slider 11 to actuator body 6. The asymmetrical relationship between the axis of lift tab 12 and the center line of head gimbal assembly 9 may also be appreciated by reference to FIG. 2 which is a top plan view of head gimbal assembly 9.

Attention is directed to FIGS. 5a, 5b, 5c and 6-8 wherein the relationship between the lift tab and center line of the load beam to which it is affixed, or of which it is a part, will be described to illustrate how a negative roll, no roll or a positive roll attitude is provided to the slider affixed to the load beam. First, referring to FIG. 5a, load beam 25 is illustrated, and includes lift tab 26 having a free end 27. Supported near the end of load beam 25 is slider 28 which is obscured by load beam 25, however edges 28a and 28b (also shown in FIGS. 6-8) are visible in this view. For convenience of explanation, load beam 25 is analogous to load beam 10 of the previous figures and is a "down" load beam. The center line of load beam 25 is indicated by reference character 29. With this configuration, the lift tab 26 extends outwardly and contacts a cam surface (not shown) along a center line 30. Line 31 indicates the point of contact between free end 27 of lift tab 26 and center line 31 of cam surface. It will be appreciated by reference to FIG. 5a that the intersection between the cam center line (indicated by reference character 30) and the contact point, indicated by line 31, of lift tab 26 is displaced from center line 29 of load beam 25. The amount of deviation is indicated by the arrows pointing to the center line of load beam 25 and the line of contact between lift tab 26 and the cam surface. As shown in FIG. 5a, this distance denoted as "-e" indicates the eccentricity of the geometry. The loading direction of slider 28 onto a disk is indicated by the arrow denoted by reference character 32. With the relationships indicated in FIG. 5a, a "negative" roll is imparted to slider 28 as is loaded onto a surface of a disk (not shown in FIG. 5a). Attention is directed to FIG. 6, which is a view taken along the lines 6—6 of FIG. 5a, which illustrates what is meant by a negative roll attitude which is imparted to slider 28 as it is being loaded above disk 33, the outer edge of which is indicated by reference character 34. As will be appreciated by reference to FIG. 6, edge 28a of slider 28 (which is nearer the center of disk 33 than is edge 28b) is higher above surface 35 than is edge 28b. By adjusting the point of contact between free end 27 of lift tab 26 and the contact point on the cam surface (not shown), the eccentricity value will be changed and similarly the roll attitude of slider 28 will also be changed. In the rigid disk drive of FIG. 1, this adjustment is achievable by use of cross-shaped slot 17 on cam assembly 14.

Referring to FIG. 5b, for illustrative purposes a no roll embodiment is illustrated. In FIG. 5b, load beam 25 is provided with lift tab 38 having free end 39, and lift tab 38 is dimensioned such that free end 39 contacts the cam surface (not shown) at intersection line center line 29 of load beam 25. Since the cam surface contact corresponds to the center line of load beam 25 no torque is applied to load beam 25 and accordingly no roll results. Therefore, as will be appreciated by reference to FIG. 7, upon loading of slider 28 above surface 35 of disk 33 edge 28a of slider 28 is approximately the same distance from surface 35 as is edge 28b, accordingly this is a "no roll" or zero roll loading attitude. As will be more fully pointed out hereinafter, it is desirable that when loading a slider that either a positive or negative roll be applied; however, the no roll or zero roll attitude is described for explanatory purposes.

Referring to FIG. 5c, along with FIG. 8, a positive roll implementation of a load beam with lift tab is illustrated. In FIG. 5c, lift tab 40 is shorter in length than either of lift tabs 38 or 26. Therefore, when free end 41 of lift tab 40 intersects the cam (not shown) at cam center line 31 the deviation between center line of load beam 25 and point of contact along cam center line 30 between the free end 41 of lift tab 40 provides a torque which lifts edge 28b higher above surface 35 of disk 33 than edge 28a as a result of the off center lifting provided by eccentricity "e". Referring to FIG. 8, it will be appreciated that edge 28a of slider 28 is nearer the surface 35 of disk 33 than is edge 28b (which is near outer edge 34 of disk 33). As pointed out above, a positive roll attitude (as illustrated in FIG. 8), or a negative roll attitude (as illustrated in FIG. 6), are preferable to a no roll attitude as illustrated in FIG. 7. It will be appreciated that the lift tab utilized on the load beam could be positioned on the other side of the center line and by appropriately adjusting the length of the lift tab to achieve the contact point with the cam surface positive, negative and no roll attitudes may be achieved.

The resulting torque is given by the following formula:

$$Torque\ (T) = preload \times eccentricity$$

where: preload = force exhibited by the load beam; and eccentricity = offset distance.

It has been found that the upper limit on torque is approximately 8-10 gm-cm. The preferable values for a device according to applicants' invention is in the range of $-0.5$ gm-cm $< T < +0.5$ gm-cm. The "$-$" and "$+$" in the foregoing range indicates negative and positive roll respectively. It will of course be appreciated that other torque values may be appropriate for different load beam structures.

Figure 10:
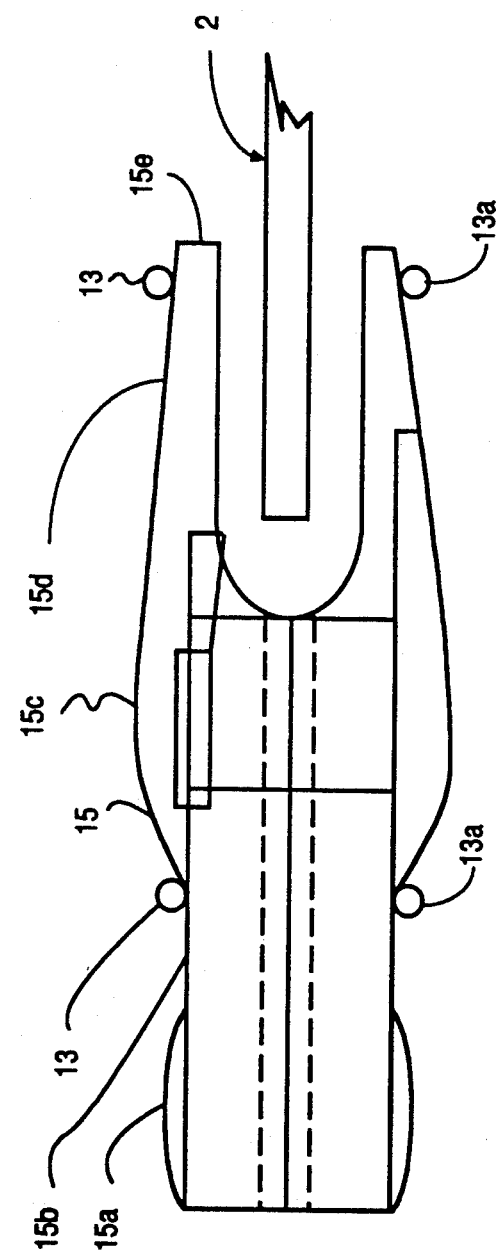
FIG. 10 is a cross-sectional view taken along the lines 10—10 in FIG. 9.

Referring to FIG. 9, a highly enlarged portion of rigid disk drive 1 (in top plan view) adjacent to the end of head gimbal assembly 9 which supports slider 11 is illustrated. In FIG. 9, head gimbal assembly 9 is illustrated in three positions for purposes of illustrating how the head gimbal assembly 9 is initially loaded and placed into position for cooperation with cam assembly 14 and further how, as best illustrated in FIG. 10, head gimbal assembly 9 and a lower head gimbal assembly if utilized, cooperates with cam assembly 14 for the dynamic loading and unloading of the sliders supported on the ends of respective head gimbal assemblies 9. The position of head gimbal assembly 9 to the left-most portion of FIG. 9 is the beginning load position after installation of the rotary actuator into the drive for initial assembly purposes. This initial installation position is illustrated in the left-hand portion of FIG. 9 in which, it will be appreciated by reference to the figure, that free end 13 of lift tab 12 is unrestrained. Head gimbal assembly 9 is rotated in a counter-clockwise direction and free end 13 of lift tab 12 travels over lobe portion 15a (as illustrated in FIG. 6) and with no further force being applied to rotate head gimbal assembly 9 free end 13 comes to rest in the detent position in valley portion 15b of cam surface 15. In FIG. 9, this position is illustrated as the central position of the three positions of head gimbal assembly 9. This is the at rest (or unloaded) position for head gimbal assembly 9 and is where the assembly would be located prior to loading the heads on the disk. In operation, during start-up power is applied the drive motor and rigid disk 2 is brought up to rotational speed after which suitable current is applied to the coil of the drive motor for the rotary actuator and head gimbal assembly 9 is rotated in a counter-clockwise direction during which free end 13 moves to the right as viewed in FIGS. 9 and 10), travels over lobe portion 15c and then down descending portion 15d of cam surface 15 to the position illustrated in the rightmost portion of FIGS. 9 and 10 where slider 11 moves adjacent to the surface of disk 2. As a result of the asymmetrical position of lift tab 12 on load beam 9, during this loading operation the edge of slider 11 closer to the inner diameter of disk 2 will be lower than the edge of slider 11 nearer the outer diameter of disk 2. This provides a positive roll attitude to slider 11. It will be recalled from above that a positive roll is the type illustrated in FIG. 8.

Even though the dynamically loaded head does not contact the disk directly, after several thousand load-/unloads a small amount of wear which appears as edge blending at one corner or edge of the head is evident. This blending is caused by the head contacting the higher asperities (4 to 8 microinches high) on the disk and burnishing them off. Once the burnishing has occurred, both the lower asperity height and blended head no longer contact each other and wear does not progress. The head has sustained some minor wear (1 to 10 microinches) at a position of initial approach to the disk. This wear can be at a sensitive area of the head or an insensitive area. The tunable roll feature of the present invention permits controlling the location of the blending and guaranteeing that it occurs at a non-sensitive area.

The read/write element is generally located at the rear of the slider in order to be as close as possible to the magnetic media (most often 5 to 10 microinches flying height). If the blending occurs at the read/write gap, a change in gap separation may occur, changing the magnetic performance of the head. However, if the blending occurs along an edge of the air bearing, the flying height of the whole head is little affected since its surface area is very large compared to the blended area. By introducing some roll into the head during loading and unloading, the blending is forced away from the sensitive area and the system integrity is improved.

Referring to FIG. 10, the slope of portion 15d of cam surface 15, measured with respect to the surface of rigid disk 2, may be in the range of from about 7° to 18°. The preferable range has been found to be between about 9° to 12°. As will be appreciated by reference to FIG. 10, rigid disk 2 extends at its outer periphery interiorly at the end 15e of cam surface 15, as well as interiorly of the lower cam surface (not numbered). Adjustability of cam assembly 14 in the direction generally radial to rigid disk 2 permits, as will be appreciated by reference to FIGS. 9 and 10, adjustment of the landing position of slider body 11 on the surface of rigid disk 2.

Figure 11:
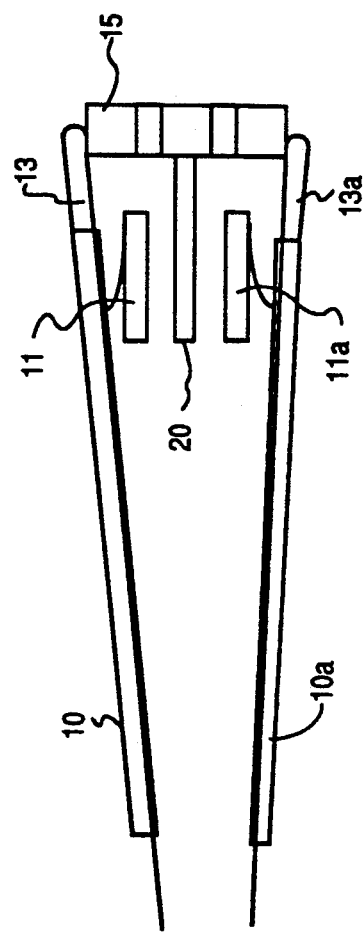
FIG. 11 is a cross-sectional view taken along the line 11—11 of FIG. 1.

As mentioned previously, a second head gimbal assembly may be supported beneath head gimbal assembly 9. By utilizing a similar support arrangement to that used for head gimbal assembly 9, the second head gimbal assembly with its associated slider and read/write element may be dynamically loaded into operative relationship with the lower surface of disk 2. In FIG. 10 reference characters 13a indicate the respective detent and load positions of the end of a lift tab used on a lower gimbal assembly. When upper and lower actuator arms are utilized, it is desirable to include protective member 20 (illustrated in FIGS. 1, 9 and 11) which extends intermediate the upper and lower head gimbal assemblies and is positioned in a plane generally parallel with the plane of disk 2. Referring to FIG. 11, a view along the lines of 11—11 of FIG. 1 is provided to better illustrate protective member 20. In FIG. 11, up load beam 10a along with its associated up slider 11a and free end 13a of up load beam 10a are illustrated, along with load beam 10, down slider 11 and lift tab 12 with its free end 13, all in the unloaded position. For simplification of view, rigid disk 2 and the remaining portion of cam assembly 14 are not shown in FIG. 11 It will be appreciated by a reference to FIG. 11 that protective member 20 prevents the unwanted impact between slider 11 and slider 11a should a shock be transmitted to disk drive 1 while the sliders are in the unloaded position. When the head gimbal assemblies are positioned outside of the travel above the surface of disk 2, by utilizing protective member 20 shocks which may be transmitted to disk drive 1 which would move flexure 19 and would otherwise cause slider 11 to impact up slider 11a of up load beam 10a are no longer a problem since protective member 20 prevents slider-to-slider impacts. Without the use of protective member 20, the read/write elements on their respective sliders may be damaged. Protective member 20 also limits destructive overtravel of flexure 19. Protective member 20 may either be a separate planar structure or formed as part of cam assembly 14. When formed as part of cam assembly 14 it would of course be constructed of the same material; however, if a separate member is utilized, it is preferred that it be composed of a soft resin impregnated with PTFE (which is also referred to by the tradename Teflon).

Figures 12A, 12B:
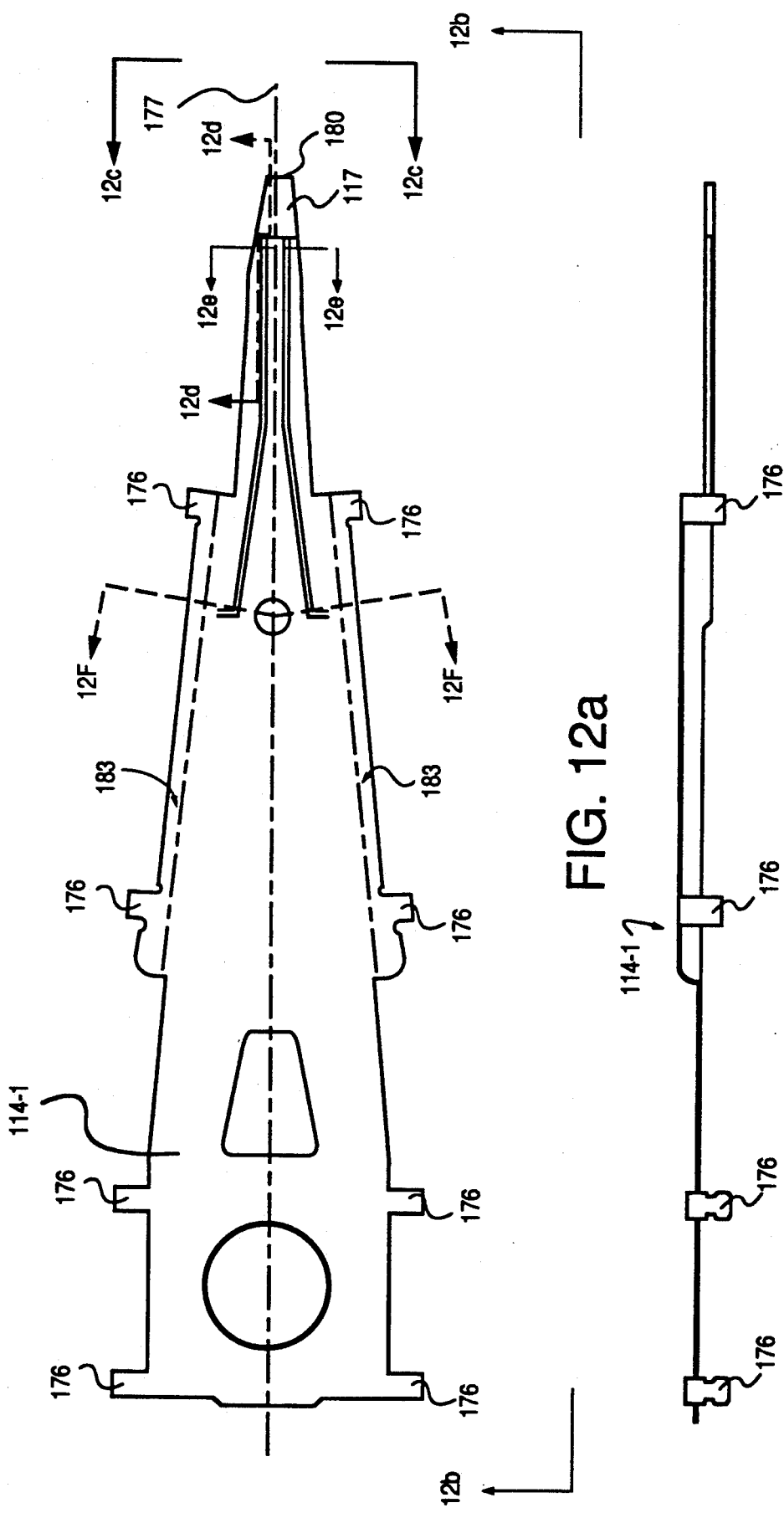
Figures 1, 12C:
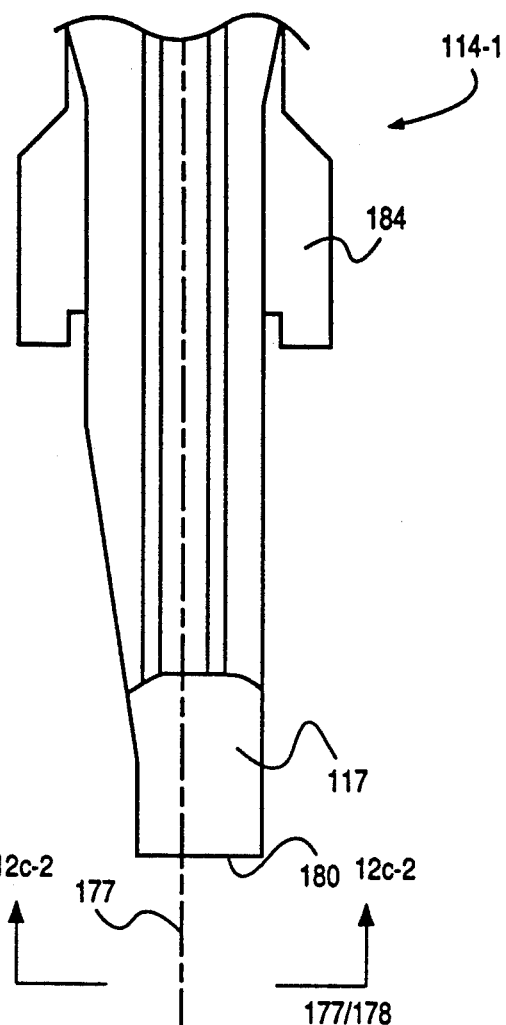
Figures 2, 12C:
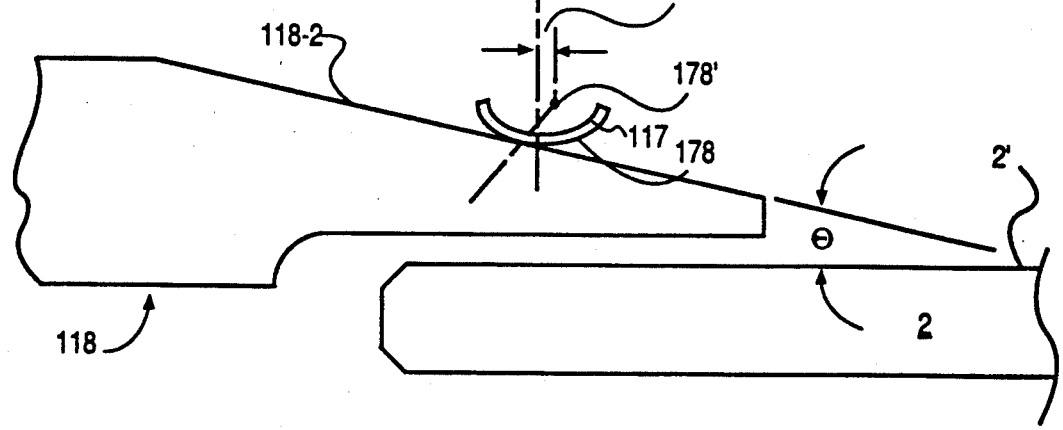
Figure 12:
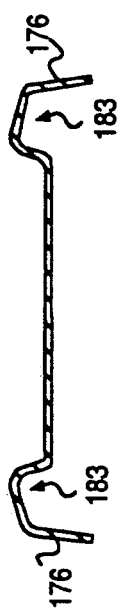
Figure 12:
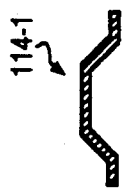
Figure 12:
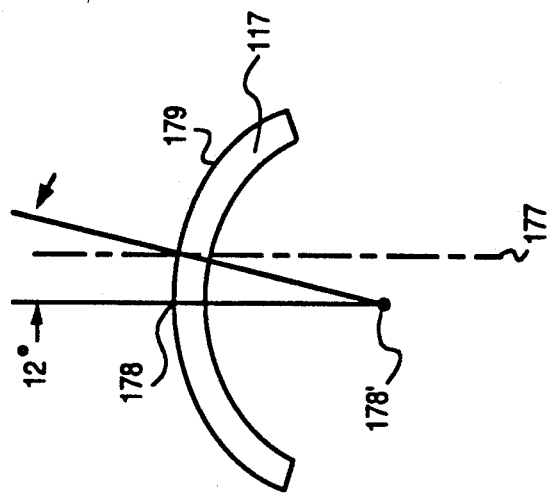

A second embodiment of the present invention is illustrated in FIGS. 12a–12f. A better appreciation of the construction of the load beam in accordance with the second embodiment of the present invention will be obtained by reference to FIGS. 12a–12j. Referring to FIG. 12a, load beam 114-1 is shown in plan view with the underside, that is the side on which the read/write recording transducer will be mounted, facing upward in this figure. Load beam 114-1 is referred to as the down load beam. Load beam 114-1 is unitary in construction and is preferably made from Type 302 non-magnetic stainless steel, having a thickness of approximately 0.0025 mm. As illustrated in FIG. 12a, load beam 114-1 includes lift end 180 as will be appreciated by reference to FIG. 12c tab 117 which is semicircular in cross section at its free and 12c". FIG. 12b illustrates load beam 114-1 in a side view taken along lines 12b—12b of FIG. 12a. In the view of FIG. 12b, the load beam 114-1 is shown in a flat and unloaded orientation. Tabs, denominated 176, are utilized to secure the electrical wiring which extends to the free end of the load beam for connection to the read/write transducer head to be mounted at that location. The cross-section of load beam 114-1 taken along lines 12e—12e is illustrated in FIG. 12e. The configuration of load beam 114-1 changes from a generally flat orientation (with the exception of tabs 176 and stiffening channels 183 along the outer edge of the load beam) as shown in FIG. 12f, the cross-section taken along lines 12f—12f, to the configuration illustrated in FIG. 12e, and near the free end of load beam 114-1 the lift tab 117 is generally semi-circular as is illustrated in FIG. 12c which shows the view of load beam 114-1 taken along the line 12c—12c in FIG. 12a. As will be appreciated by a reference to FIG. 12a, the center line of load beam 114-1 is at the position indicated by the dashed line denominated 177. It will also be appreciated by reference to FIG. 12a that the curved end portion of lift tab 117 is not symmetrical with respect to center line 177. This is also further illustrated in FIG. 12c where the center line of load beam 114-1 is indicated by dashed line denominated 177. The lowest point on lift tab 117 as measured from the center of radius 178' is indicated in FIG. 12c by reference line 178 which extends to the lower surface 179 of lift tab 117.

A better appreciation the offset relationship between the free end of lift tab 117 and the centerline 177 of down load beam 114-1 will be obtained by reference to FIGS. 12c' and 12c". FIG. 12c' is a top plan view of down load 114-1 showing the end portion thereof and a portion of flexure 184. For simplicity, cam assembly 118 and disk 2 are not shown in FIG. 12c'. In FIG. 12c", which is a view taken along 12c"—12c", it will be appreciated that the centerline 177 of load beam 114-1 is to the left of the lowest point of tab 117 (indicated by 178) to provide an offset distance 177/178. The free end of lift tab 117 is offset toward the center of disk 2 to provide symmetrical lifting of load beam 114-1 as it contacts cam surface 118-2. In FIG. 12c" load tab 117 is illustrated at the position where first contact is made with cam surface 118-2. The amount of the offset 177/178 is determined based on the angular slope θ, which is measured between cam surface 118-2 and surface 110' of disk 2, along with the radius of lift tab 117, the radius being measured from center of radius 178' and the lower surface 179. The lowest point of tab 117 is indicated at 178. The centerline offset may be calculated by the formula

*Centerline Offset* = $R$ sine $\theta$ where $\theta$ = angle between disk surface and cam surface $R$ = radius of curvature of load tab contacting the cam surface With this offset, the lifting force on load beam 114-1 will be applied symmetrically along the centerline of load beam 114-1. In the preferred embodiment, the angle $\theta$ is 12°, and the radius of lift tab 117 at the point of contact with cam surface 118-2 is 0.46 mm. This results in offset 177/178 being 0.095 mm. Similarly, the up load beams have their tab ends offset, also toward the center of the disk, thereby ensuring that the first surface of the load tab to contact its corresponding cam surface does so along the center line of the load beam. This centerline contact eliminates any twisting forces on the load beam.

Figure 12D:
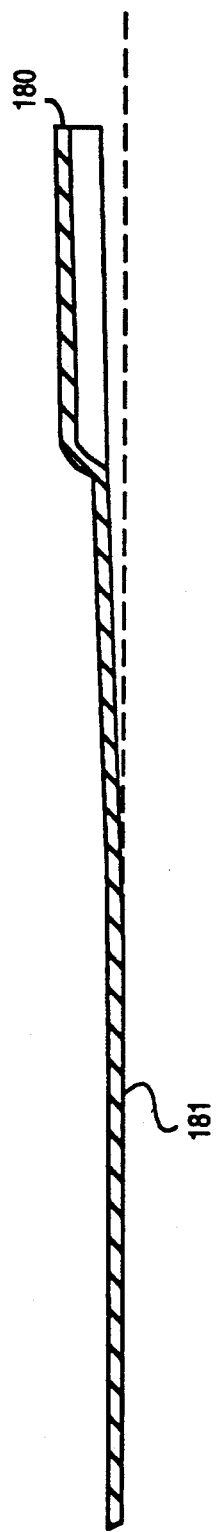
Figure 12J:
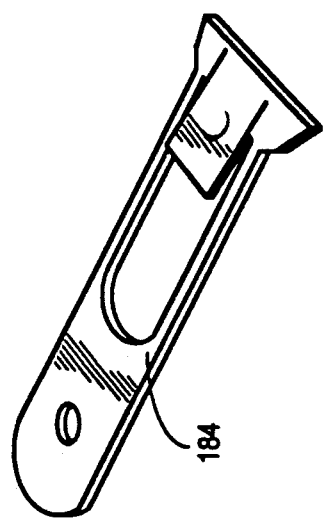
FIG. 12j is a perspective view of flexure 184.
Figure 12:
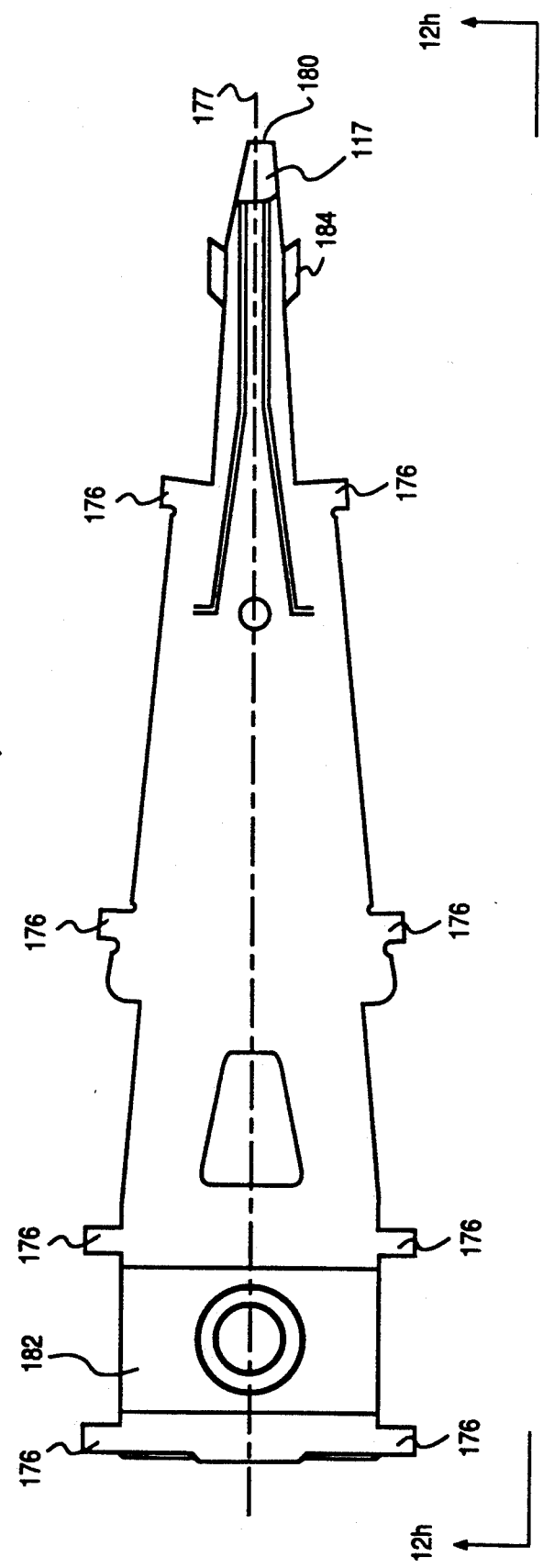

Referring to FIG. 12d, a cross-sectional view taken along the line 12d—12d of FIG. 12a, it will be appreciated that the free end 180 of load 117 is offset downwardly (with respect to the surface of the disk with which the load beam interfaces) from the plane of the flat surface of load beam 114-1 indicated by reference character 181 in FIG. 12d. This offset is provided to maximize the clearance between load beams when the read/write heads are unloaded. Referring to FIG. 12g, swage plate 182 is illustrated. Swage plate 182 is utilized in connecting the load beam to the actuator body. Also illustrated in FIG. 12g is flexure 184, only a portion of which is illustrated in this figure. Flexure 184 is utilized to support the read/write transducer head in a flexible manner below the underside of its respective load beam. A perspective view of flexure 184 is illustrated in FIG. 12j.

A side view of load beam 114-1 with its swage plate 182 is illustrated in FIG. 12h which is a view taken along the lines 12h—12h in FIG. 12g. In FIG. 12h the load beam, flexure and associated read/write transducer are illustrated in loaded position. FIG. 12i illustrates load beam 114-1 with associated read/write transducer and flexure in the unloaded position. As illustrated in FIG. 12i, there is a normal downward positioning of the free end of load beam 114-1 which is by bending load beam 114-1 to provide a predetermined pre-tensioning.

Figure 13:
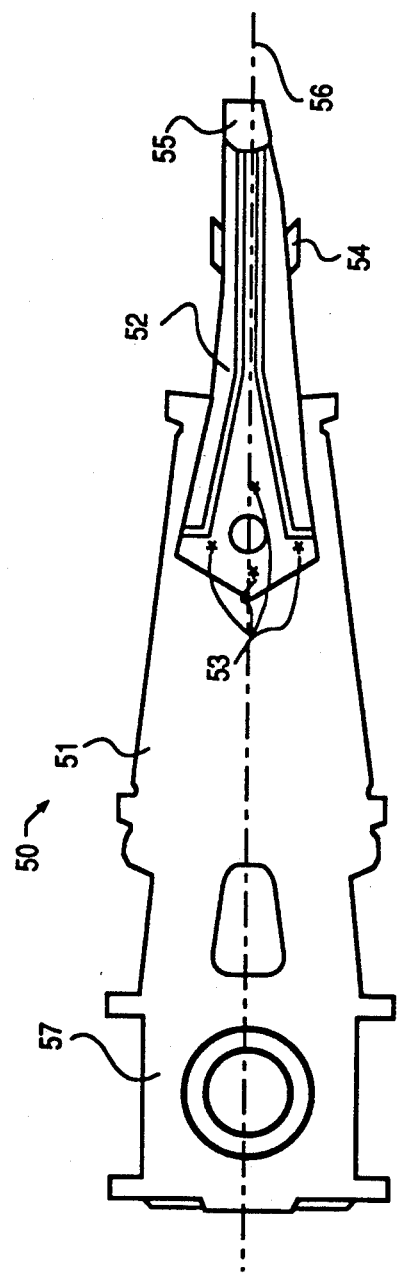
FIG. 13 illustrates is plan view a third embodiment of the present invention.

In accordance with a third embodiment of the present invention, the actuator arm, which is also referred to as a load beam, is constructed using a separate lift tab portion which is welded to a support arm portion, rather than providing the actuator arm load beam as a unitary structure, as in the case of the second embodiment described above in which load beam 114-1 is a unitary structure. Referring to FIG. 13, the actuator arm, referred to hereinafter is the load beam 50, is illustrated in a top plan view which shows the top side of load beam 50, which in the present invention is the down load beam. Load beam 50 includes support arm portion 51 and lift tab portion 52. Lift tab portion 52 is laser welded to the support arm portion, the laser weld spots being indicated at 53. A portion of the flexure (which is also laser welded to support arm portion 51) is illustrated at 54. The geometry of lift tab portion 52 is preferably substantially the same as the geometry of the lift tab portion of the unitary load beam 114-1 illustrated in FIG. 12a. More particularly, the end portion 55 of lift tab portion 52 is axially offset toward the center of the disk with respect to the centerline 56 of support arm portion 51. The relationship between end portion 55 and support arm portion 51 is preferable the same as that illustrated in FIGS. 12c, and 12c". End 57 of support arm portion 51 is adapted for attachment to actuator body 6 of the rotary actuator used in the drive. The offset relationship for end portion 55 of lift tab portion 52 is preferable determined utilizing the same formula relationships described above. With regard to the structural characteristics of load beam 50, support arm portion 51 may be constructed of the same material used and described above with respect to load beam 114-1. Lift tab portion 52 is preferable also constructed from the same material. Flexure 54, which is more fully illustrated in FIG. 14, is preferably constructed using the same material as flexure 184 (illustrated in FIG. 12j).

Figure 14:
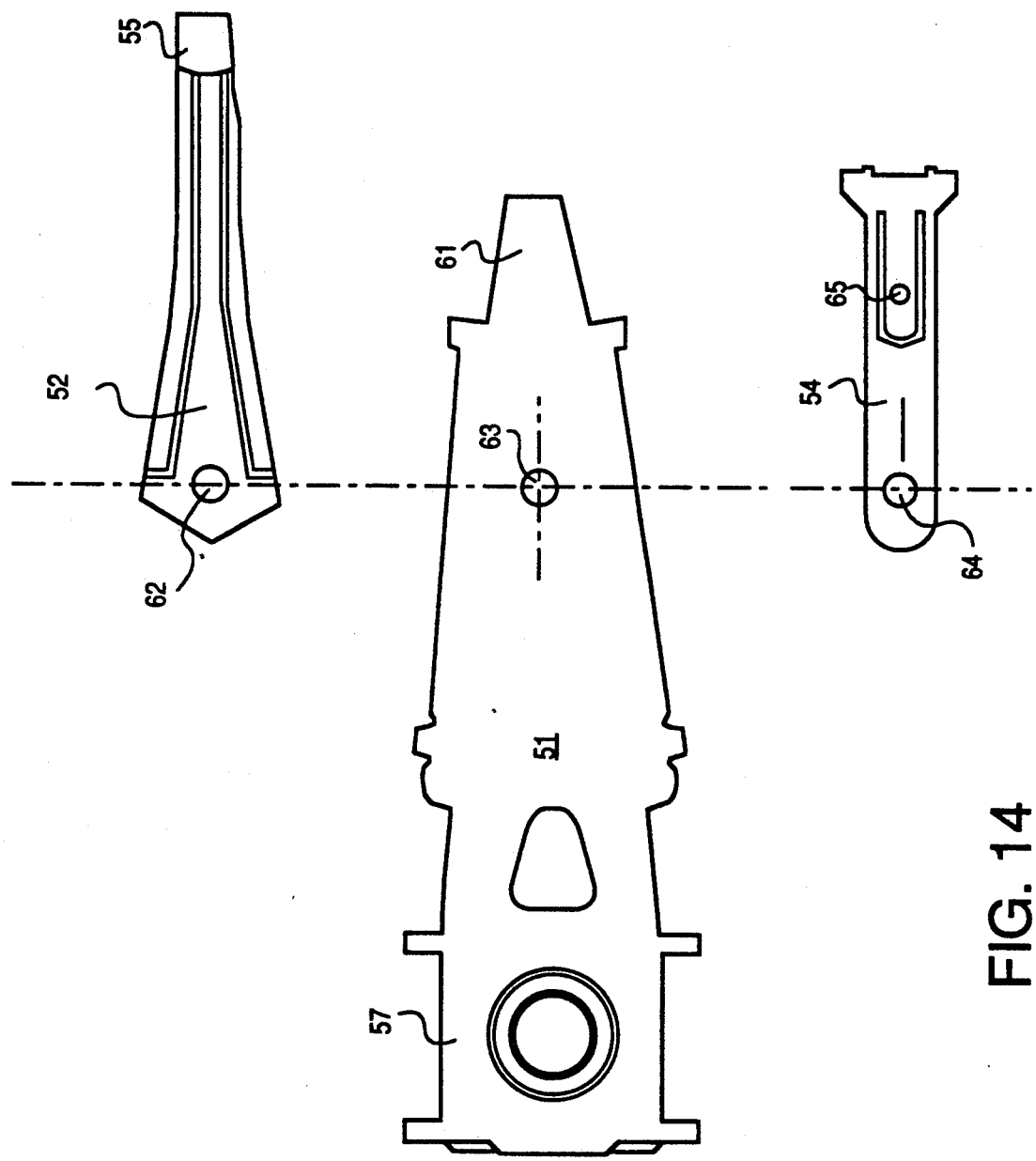
FIG. 14 illustrates in an exploded form major elements of the dynamic load beam in accordance with the third embodiment of the present invention.

Referring to FIG. 14, support arm portion 51 is illustrated in top plan view to disclose its complete structure, which cannot be fully seen in FIG. 13 because of lift tab portion 52 being welded in place. Support arm portion 51 includes tongue portion 61. As illustrated in FIG. 14, lift tab portion 52 includes alignment hole 62, support arm portion 51 includes alignment hole 63 and flexure 54 includes alignment hole 64.

Flexure 54 is welded in place on the underside of support arm 51 and lift tab portion 52 is welded in place on the top side (the side shown in FIG. 14) and during the assembly process alignment holes 62, 63 and 64 are utilized to position the parts in appropriate alignment. When welded in place, dimple portion 65 of flexure 54 is positioned beneath tongue portion 61 of support arm 51 and provides a gimbaling support for the slider body which is attached to the underside of the flexure 54. For ease of illustration, the slider body is not illustrated in these figures.

Those skilled in the art will of course appreciate that the various modifications may be made to our invention without departing from the spirit and scope thereof and that the foregoing description is illustrative of several embodiments of our invention, however the scope of our invention is governed by the appended claims.

We claim:

1. A rigid disk drive comprising:
   a baseplate;
   a rigid disk supported on said baseplate for rotation;
   an elongated actuator arm including an load beam, said actuator arm being pivotally supported about a center of rotation on said baseplate, for rotation of one end of said load beam in a plane substantially parallel to a surface of said disk, said load beam including at its outermost end a lift tab, said lift tab being positioned such that a centerline of said lift tab is offset from a centerline of said load beam;
   a slider body including a read/write recording element;

means connected to said load beam and said slider body for supporting said slider body at a position intermediate said center of rotation and said lift tab; and a cam assembly supported on said baseplate adjacent to said lift tab and the edge of said disk, said cam assembly including a cam surface positioned in operative relationship with said lift tab, said lift tab contacting said cam surface and in cooperation with said cam surface providing a lifting force along the centerline of said load beam.

2. A rigid disk drive according to claim 1, wherein said cam surface includes a contour which permits rotational movement of said actuator arm in a direction opposite to the direction of rotation of said actuator arm during positioning of said slider body over the surface of said disk and in an amount sufficient to permit installation of said rigid disk without interference with said actuator arm.

3. A rigid disk drive according to claim 1, wherein the portion of said lift tab which contacts the cam surface is curvilinear about a center of radius and has a radius R, and wherein the surface of the cam is inclined at an angle $\theta$ with respect to said surface of said disk the amount of said offset is determined by the formula:

$$Offset = R \sin \theta.$$

4. A rigid disk drive according to claim 1, wherein said lift tab is semicircular in the region where said lift tab contacts the cam surface of said cam assembly.

5. A rigid disk drive according to claim 1, wherein said load beam comprises:

a support arm portion having a first end supported for rotation about said center of rotation; and a lift tab portion having a first end attached to said first end of support arm portion, said lift tab portion having a second end which extends beyond said first end of said support arm portion, said second end of said lift tab portion including a lift tab contact portion adapted for cooperation with said cam surface, said lift tab contact portion being positioned such that a centerline of said lift tab portion is offset from a center line of said load beam.

* * * * *